US010002385B2

(12) United States Patent
Renton et al.

(10) Patent No.: US 10,002,385 B2
(45) Date of Patent: Jun. 19, 2018

(54) MANAGING THE EXECUTION OF TRADES BETWEEN MARKET MAKERS

(75) Inventors: Nigel J. Renton, London (GB); Michael Sweeting, England (GB)

(73) Assignee: BGC PARTNERS, INC., New York, NY (US)

( * ) Notice: Subject to any disclaimer, the term of this patent is extended or adjusted under 35 U.S.C. 154(b) by 2207 days.

(21) Appl. No.: 10/694,872

(22) Filed: Oct. 28, 2003

(65) Prior Publication Data

US 2005/0091142 A1 Apr. 28, 2005

(51) Int. Cl.
*G06Q 40/00* (2012.01)
*G06Q 40/04* (2012.01)

(52) U.S. Cl.
CPC .................................. *G06Q 40/04* (2013.01)

(58) Field of Classification Search
CPC ............................. G06Q 40/04; G06Q 40/40
USPC ....................................................... 705/35–40
See application file for complete search history.

(56) References Cited

U.S. PATENT DOCUMENTS

| | | | |
|---|---|---|---|
| 4,412,287 A | 10/1983 | Braddock, III | 364/408 |
| 5,305,200 A | 4/1994 | Hartheimer et al. | 364/408 |
| 5,727,165 A | 3/1998 | Ordish et al. | 395/237 |
| 5,809,483 A | 9/1998 | Broka et al. | 705/37 |
| 5,890,138 A | 3/1999 | Godin et al. | 705/26 |
| 5,905,974 A | 5/1999 | Fraser et al. | 705/37 |
| 5,963,923 A | 10/1999 | Garber | 705/37 |
| 6,216,114 B1 | 4/2001 | Alaia et al. | 705/37 |
| 6,493,682 B1 | 12/2002 | Horrigan et al. | 705/36 |
| 6,499,108 B1 | 12/2002 | Johnson | 713/201 |
| 7,613,650 B2 | 4/2003 | Smith et al. | |
| 6,560,580 B1 | 5/2003 | Fraser et al. | 705/37 |
| 6,598,026 B1 | 7/2003 | Ojha et al. | 705/26 |
| 6,751,597 B1 | 6/2004 | Brodsky et al. | 705/37 |
| 7,003,483 B1 | 2/2006 | Davis | 705/36 |
| 7,076,461 B2 | 7/2006 | Balabon | 705/37 |
| 7,099,839 B2 | 8/2006 | Madoff et al. | 705/37 |
| 7,181,424 B1 * | 2/2007 | Ketchum | G06Q 30/0627 705/35 |

(Continued)

FOREIGN PATENT DOCUMENTS

| | | |
|---|---|---|
| JP | 2001-195479 | 7/2001 |
| JP | 2003-076885 | 3/2003 |

(Continued)

OTHER PUBLICATIONS

McGinn: "Internet wave hits FX trading market", Wall Street & Technology, New York, Second Quarter 2000. p. 16, 3 pgs.*

(Continued)

*Primary Examiner* — Edward J Baird

(57) ABSTRACT

According to one embodiment, a method of managing trading is provided. A first bid for a first instrument is received from a first market maker at a first bid price. A first offer for the first instrument is received from a second market maker at a first offer price, the first offer price being lower than the first bid price. As a result of the first offer price being lower than the first bid price, the first bid price is automatically decreased to match the first offer price, and a first timer having a predetermined duration is started. If the first timer expires and both the first bid and the first offer exist at the first offer price when the first timer expires, a trade between the first bid and the first offer is automatically executed.

55 Claims, 4 Drawing Sheets

(56) References Cited

U.S. PATENT DOCUMENTS

| | | | |
|---|---|---|---|
| 7,212,999 B2* | 5/2007 | Friesen et al. | 705/37 |
| 6,618,707 B1 | 7/2007 | Katz | |
| 7,246,093 B1* | 7/2007 | Katz | 705/37 |
| 7,428,506 B2 | 9/2008 | Waelbroeck et al. | |
| 7,430,533 B1* | 9/2008 | Cushing | 705/37 |
| 7,664,695 B2 | 2/2010 | Cutler | |
| 7,680,721 B2 | 3/2010 | Cutler | |
| 7,844,536 B1* | 11/2010 | Andrews | G06Q 40/04 705/37 |
| 8,346,652 B2 | 1/2013 | Smith et al. | |
| 8,818,890 B2 | 8/2014 | Renton et al. | |
| 2001/0039527 A1 | 11/2001 | Ordish et al. | 705/37 |
| 2001/0047323 A1 | 11/2001 | Schmidt | 705/37 |
| 2001/0049651 A1 | 12/2001 | Selleck | 705/37 |
| 2001/0056393 A1 | 12/2001 | Tilfors et al. | 705/37 |
| 2002/0004776 A1 | 1/2002 | Gladstone | |
| 2002/0010673 A1 | 1/2002 | Muller et al. | 705/37 |
| 2002/0019795 A1 | 2/2002 | Madoff et al. | 705/37 |
| 2002/0052827 A1* | 5/2002 | Waelbroeck et al. | 705/37 |
| 2002/0077962 A1 | 6/2002 | Donato et al. | 705/37 |
| 2002/0082967 A1 | 6/2002 | Kaminsky | |
| 2002/0087456 A1 | 7/2002 | Abeshouse et al. | |
| 2002/0116317 A1* | 8/2002 | May | G06Q 30/08 705/37 |
| 2002/0169703 A1* | 11/2002 | Lutnick et al. | 705/37 |
| 2002/0169704 A1 | 11/2002 | Gilbert et al. | |
| 2002/0184136 A1* | 12/2002 | Cleary Neubert et al. | 705/37 |
| 2002/0194107 A1 | 12/2002 | Li et al. | |
| 2002/0194136 A1* | 12/2002 | Sullivan et al. | 705/64 |
| 2002/0198816 A1 | 12/2002 | Gilbert et al. | 705/37 |
| 2003/0065608 A1 | 4/2003 | Cutler | 705/37 |
| 2003/0083983 A1 | 5/2003 | Fisher et al. | 705/37 |
| 2003/0130925 A1 | 7/2003 | Malitzis | 705/37 |
| 2003/0135443 A1 | 7/2003 | Moore et al. | 705/37 |
| 2003/0139997 A1* | 7/2003 | Ginsberg | 705/37 |
| 2003/0140005 A1 | 7/2003 | Cole | 705/40 |
| 2003/0195839 A1 | 10/2003 | Dinwoodie | |
| 2003/0229557 A1* | 12/2003 | Richmann | G06Q 40/04 705/36 R |
| 2003/0229570 A1* | 12/2003 | Hughes et al. | 705/37 |
| 2004/0024713 A1* | 2/2004 | Moore | G06Q 20/382 705/75 |
| 2004/0034591 A1 | 2/2004 | Waelbroeck et al. | |
| 2004/0059666 A1* | 3/2004 | Waelbroeck | G06Q 40/04 705/37 |
| 2004/0078317 A1 | 4/2004 | Allen et al. | 705/37 |
| 2004/0177024 A1 | 9/2004 | Bok et al. | 705/37 |
| 2004/0193527 A1 | 9/2004 | Kelly | |
| 2004/0215538 A1* | 10/2004 | Smith et al. | 705/35 |
| 2004/0230520 A1 | 11/2004 | Reding et al. | 705/37 |
| 2004/0254804 A1 | 12/2004 | Peterffy et al. | 705/1 |
| 2005/0049956 A1 | 3/2005 | Ballman | 705/37 |
| 2005/0075965 A1 | 4/2005 | Cutler | 705/37 |
| 2005/0091142 A1 | 4/2005 | Renton et al. | 705/37 |
| 2005/0137961 A1 | 6/2005 | Brann | |
| 2005/0171890 A1 | 8/2005 | Daley et al. | 705/37 |
| 2005/0187854 A1 | 8/2005 | Cutler et al. | 705/37 |
| 2005/0228741 A1 | 10/2005 | Leibowitz | 705/37 |
| 2005/0234805 A1 | 10/2005 | Robertson et al. | 705/37 |
| 2005/0234806 A1 | 10/2005 | Findlay et al. | 705/37 |
| 2005/0240513 A1 | 10/2005 | Merold | |
| 2005/0256800 A1 | 11/2005 | Hogg et al. | 705/37 |
| 2005/0262003 A1 | 11/2005 | Brumfield et al. | 705/37 |
| 2006/0020536 A1* | 1/2006 | Renton et al. | 705/37 |
| 2006/0229967 A1 | 10/2006 | Sweeting | 705/37 |
| 2015/0088725 A1 | 3/2015 | Renton et al. | |

FOREIGN PATENT DOCUMENTS

| | | | |
|---|---|---|---|
| JP | 2003-281369 | 10/2003 | |
| WO | WO 2000/036533 | 6/2000 | |
| WO | WO-0122313 A2 * | 3/2001 | G06Q 30/0627 |
| WO | WO 01/084419 | 11/2001 | |

OTHER PUBLICATIONS

NASD Notice to Members 00-29: "Locked/Crossed Markets SEC Approves Changes To Nasdaq Locked/Crossed Markets Rule; dated Jun. 5, 2000", (Year: 2000).*

United States Patent and Trademark Office; Office Action for U.S. Appl. No. 10/895,668, filed Jul. 21, 2004 in the name of Nigel J. Renton; 29 pages.

Notification of Transmittal of the International Search Report, International Application No. PCT/US05/25929, 4 pages, dated Apr. 24, 2006.

Written Opinion of the International Searching Authority, International Application No. PCT/US05/25929, 4 pages, dated Apr. 24, 2006.

U.S. Appl. No. 10/895,668, entitled "System and Method for Managing Trading Orders Received From Market Makers", by Nigel J. Renton, et al., 80 pages plus 5 pages of drawings, filed Jul. 21, 2006.

Gilbert et al., U.S. Patent Publication No. US2002/0169704 A1, Systems and Methods for Controlling Traders from Manipulating Electronic Trading Markets, filed May 9, 2002, Published Nov. 14, 2002, 10 pages.

USPTO Office Action for U.S. Appl. No. 10/895,668, dated Feb. 25, 2008 (24 pages).

USPTO Office Action for U.S. Appl. No. 10/895,668, dated Dec. 24, 2008 (10 pages).

USPTO Office Action for U.S. Appl. No. 10/895,668, dated Oct. 28, 2009 (30 pages).

AU Examiner's Report for Application No. 200488525, dated Nov. 9, 2009 (2 pages).

International Search Report and Written Opinion for International Application No. PCT/US2004/035158, dated May 1, 2006 (5 pages).

International Preliminary Report on Patentability for International Application No. PCT/US2004/035158, dated Jun. 12, 2006 (4 pages).

International Preliminary Report on Patentability for International Application No. PCT/US2005/025929, dated Jan. 23, 2007 (5 pages).

Japanese Office Action with English translation for Application No. 2006-538134, dated Mar. 2, 2010 (20 pages).

Australian Examiner's Report for Application No. 2005267056, dated Apr. 1, 2010 (3 pages).

EPO Communication and extended European Search Report for Application No. 05775432.7, dated Mar. 23, 2009 (6 pages).

EPO Summons to Attend Oral Proceedings for Application No. 05775432.7, dated Feb. 22, 2010 (8 pages).

EPO Decision to Refuse for Application No. 05775432.7, dated Oct. 11, 2010 (2 pages).

EPO Brief Communication for Application No. 05775432.7, dated Oct. 11, 2010 (2 pages).

Japanese Office Action with English translation for Application No. 2006-538134, dated Oct. 19, 2010 (9 pages).

Australian Examiner's Report for Application No. 2005267056, dated May 6, 2011 (1 pages).

USPTO Office Action for U.S. Appl. No. 10/895,668, dated May 26, 2011 (12 pages).

Japanese Notice of Allowance for Application No. 2006-538134, dated Sep. 20, 2011 (3 pages).

Canadian Exam Report for Application No. 2543749, dated Jan. 18, 2012 (3 pages).

Japanese Office Action with English translation for Application No. 2007-522766, dated May 31, 2011 (8 pages).

USPTO Notice of Allowance and Fees Due for U.S. Appl. No. 10/895,668, dated Feb. 2, 2012 (8 pages).

Japanese Office Action with English translation for Application No. 2007-522766, dated Jan. 24, 2012 (4 pages).

USPTO Notice of Allowability for U.S. Appl. No. 10/895,668, dated May 1, 2012 (8 pages).

USPTO Office Action for U.S. Appl. No. 13/493,542, dated Jan. 31, 2013, 6 pages.

(56) References Cited

OTHER PUBLICATIONS

Canadian Exam Report for Application No. 2574436, dated May 29, 2013 (2 pages).
Canadian Exam Report for Application No. 2543749, dated Jul. 5, 2013 (4 pages).
EPO Communication and extended European Search Report for Application No. 04796193.3, dated Jul. 12, 2013 (4 pages).
Notice from the European Patent Office dated Oct. 1, 2007 concerning business methods, 2 pages.
Australian Examiner's Report for Application No. 2011205133, dated Sep. 24, 2013 (3 pages).
Japanese Office Action with English translation for Application No. 2011-093145, dated Apr. 9, 2013 (8 pages).
USPTO Notice of Allowance and Fees Due for U.S. Appl. No. 13/493,542, dated Nov. 19, 2013, 12 pages.
Australian Examination Report for Application No. 2012200002, dated Jan. 9, 2014 (3 pages).
USPTO Notice of Allowance and Fees Due for U.S. Appl. No. 13/493,542, dated May 23, 2014, 10 pages.
Australian First Examiners Report for Application No. 2015203356, dated Aug. 4, 2016 (3 pages).
Australian Examiner's Report for Application No. 2015238844, dated Sep. 15, 2016 (3 pages).
Canadian Exam Report for Application No. 2543749, dated Oct. 24, 2016 (6 pages).
Australian Second Examiner's Report for Application No. 2015203356, dated Jun. 20, 2017 (3 pages).
Australian Third Examiner's Report for Application No. 2015203356, dated Jul. 14, 2017 (3 pages).
Australian Fourth Examiner's Report for Application No. 2015203356, dated Jul. 31, 2017 (4 pages).
Australian Second Examiner's Report for Application No. 2015238844, dated Aug. 15, 2017 (3 pages).
Canadian Exam Report for Application No. 2543749, dated Sep. 12, 2017 (4 pages).
Canadian Exam Report for Application No. 2574436, dated May 23, 2014 (2 pages).
Canadian Notice of Allowance for Application No. 2574436, dated Jan. 26, 2015 (1 page).
Australian Examiner's Report for Application No. 2015203356, dated Jun. 20, 2017 (3 pages).

\* cited by examiner

MANAGING THE EXECUTION OF TRADES BETWEEN MARKET MAKERS

TECHNICAL FIELD OF THE INVENTION

This invention relates in general to trading markets and, more particularly, to a system and method for managing the execution of trades between market makers in a trading market.

BACKGROUND OF THE INVENTION

In recent years, electronic trading systems have gained a widespread acceptance for trading items. For example, electronic trading systems have been created which facilitate the trading of financial instruments such as stocks, bonds, currency, futures, or other suitable financial instruments.

Many of these electronic trading systems use a bid/offer process in which bids and offers are submitted to the systems by a passive side then those bids and offers are hit and lifted (or taken) by an aggressive side. For example, a passive trader may submit a "bid" to buy a particular number of 30 year U.S. Treasury Bonds at a given price. In response to such a bid, an aggressive trader may submit a "hit" in order to indicate a willingness to sell bonds to the first trader at the given price. Alternatively, a passive side trader may submit an "offer" to sell a particular number of the bonds at the given price, and then the aggressive side trader may submit a "lift" (or "take") in response to the offer to indicate a willingness to buy bonds from the passive side trader at the given price. In such trading systems, the bid, the offer, the hit, and the lift (or take) may be collectively known as "orders." Thus, when a trader submits a bit, the trader is said to be submitting an order.

In many trading systems or markets, such as the NASDAQ or NYSE, for example, trading orders may be placed by both market makers and traders, or customers. A market maker is a firm, such as a brokerage or bank, that maintains a firm bid and ask (i.e., offer) price in a given security by standing ready, willing, and able to buy or sell at publicly quoted prices (which is called making a market). These firms display bid and offer prices for specific numbers of specific securities, and if these prices are met, they will immediately buy for or sell from their own accounts. A trader, or customer, is any entity other than a market maker which submits orders to a trading system.

When the price of newly placed (aggressive) bid is greater than the price of an existing (passive) offer, a "crossed market" is created, and the bid may be referred to as a crossing bid. Similarly, when the price of newly placed (aggressive) offer is lower than the price of an existing (passive) bid, a crossed market is also created, and the offer may be referred to as a crossing offer. In many trading systems, when a bid and an offer lock (i.e., match each other) or cross, a trade is automatically executed at the price most favorable to the passive (i.e., the first submitted) order. For example, if a first market maker submits a bid at a price of 15, and a second market maker submits an offer of 14, a cross market is created and a trade is executed at the price of 15, which is the most favorable price to the first market maker.

SUMMARY OF THE INVENTION

In accordance with the present invention, systems and methods for managing the execution of trades between market makers in a trading market are provided.

According to one embodiment, a method of managing trading is provided. A first bid for a first instrument is received from a first market maker at a first bid price. A first offer for the first instrument is received from a second market maker at a first offer price, the first offer price being lower than the first bid price. As a result of the first offer price being lower than the first bid price, the first bid price is automatically decreased to match the first offer price, and a first timer having a predetermined duration is started. If the first timer expires and both the first bid and the first offer exist at the first offer price when the first timer expires, a trade between the first bid and the first offer is automatically executed.

According to another embodiment, another method of managing trading is provided. A first offer for a first instrument is received from a first market maker at a first offer price. A first bid for the first instrument is received from a second market maker at a first bid price, the first bid price being higher than the first offer price. As a result of the first bid price being higher than the first offer price, the first offer price is automatically increased to match the first bid price, and a first timer having a predetermined duration is started. If the first timer expires and both the first offer and the first bid exist at the first bid price when the first timer expires, a trade between the first offer and the first bid is automatically executed.

According to yet another embodiment, a system for managing trading is provided. The system includes is a computer system having a processor, and a computer readable medium coupled to the computer system. The computer readable medium includes a program. When executed by the processor, the program is operable to receive a first bid for a first instrument from a first market maker at a first bid price; receive a first offer for the first instrument from a second market maker at a first offer price, the first offer price being lower than the first bid price; as a result of the first offer price being lower than the first bid price, automatically decrease the first bid price to match the first offer price; start a first timer having a predetermined duration; and if the first timer expires and both the first bid and the first offer exist at the first offer price when the first timer expires, automatically execute a trade between the first bid and the first offer.

Various embodiments of the present invention may benefit from numerous advantages. It should be noted that one or more embodiments may benefit from some, none, or all of the advantages discussed below.

One advantage of the invention is that a trading system is provided in which locked or crossed markets between two market makers does not automatically trigger the execution of a trade between the two market makers. A cross timer is started during which the market maker that submitted the first order (the passive order) may withdraw or move it bid or offer in order to avoid an automatically executed trade with the other market maker. This may be advantageous to market makers who desire some delay time in order to decide whether to avoid automatically executed trade with subsequent orders from other market makers. For example, in a market which receives two or more separate electronic feeds from market makers and/or customers, market makers may wish to have some time to update their bid and/or offer prices to keep up with the current market or orders from other market makers.

Other advantages will be readily apparent to one having ordinary skill in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OF THE DRAWINGS

Example embodiments of the present invention and their advantages are best understood by referring now to FIGS. 1 through 4B of the drawings, in which like numerals refer to like parts.

In general, a trading system is provided in which locked or crossed markets between two market makers does not automatically trigger the execution of a trade between the two market makers. Rather, a timer is started during which the market maker that submitted the first order (the passive order) may withdraw or move it bid or offer such that neither a locked nor crossed market exists with the second (aggressive) order, and thus a trade between the two market makers is avoided. In the case of a crossed market between the two market makers, the price of the first, passive order is automatically moved by the trading system to create a locked market with the second, aggressive order. If this locked market still exists when the timer expires, a trade is automatically executed between the two market makers at the locked price, which is the price most favorable to the first, passive market maker. Thus, a market maker whose order is crossed by an order from another market maker has a period of time in which to move its order to avoid a trade being automatically executed with the other market maker. This is advantageous to market makers who do not want their orders to be automatically executed with those submitted by other market makers, which is particularly significant in markets which receive two or more separate electronic feeds from market makers and/or customers.

Figure 1:
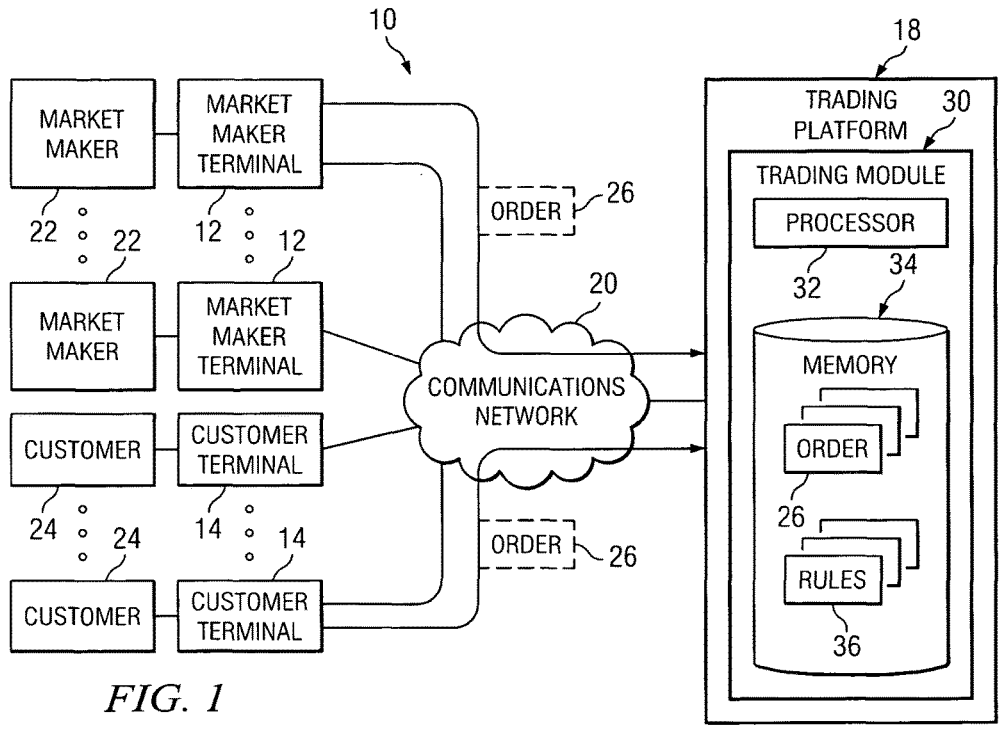
FIG. 1 illustrates an example system for managing the execution of trades between market makers in a trading market in accordance with an embodiment of the invention.

FIG. 1 illustrates an example trading system 10 according to an embodiment of the present invention. As shown, system 10 may include one or more market maker terminals 12 and one or more customer terminals 14 coupled to a trading platform 18 by a communications network 20.

A market maker terminal 12 may provide a market maker 22 access to engage in trading activity via trading platform 18. A market maker terminal 12 may include a computer system and appropriate software to allow market maker 22 to engage in trading activity via trading platform 18. As used in this document, the term "computer" refers to any suitable device operable to accept input, process the input according to predefined rules, and produce output, for example, a personal computer, workstation, network computer, wireless data port, wireless telephone, personal digital assistant, one or more processors within these or other devices, or any other suitable processing device. A market maker terminal 12 may include one or more human interface, such as a mouse, keyboard, or pointer, for example.

A market maker 22 may include any individual or firm that submits and/or maintains both bid and ask orders simultaneously for the same instrument. For example, a market maker 22 may include an individual or firm, such as a brokerage or bank, that maintains a firm bid and ask price in a given security by standing ready, willing, and able to buy or sell at publicly quoted prices (which is called making a market). These firms display bid and offer prices for specific numbers of specific securities, and if these prices are met, they will immediately buy for or sell from their own accounts. Many "over the counter" (OTC) stocks have more than one market maker. In some markets, market-makers generally must be ready to buy and sell at least 100 shares of a stock they make a market in. As a result, a large order from a customer, or investor, may have to be filled by a number of market makers at potentially different prices.

A customer terminal 14 may provide a customer, or investor, 24 access to engage in trading activity via trading platform 18. A customer terminal 14 may include a computer system and appropriate software to allow customer 22 to engage in trading activity via trading platform 18. A market maker terminal 12 may include one or more human interface, such as a mouse, keyboard, or pointer, for example.

A customer 24 is any entity, such as an individual, group of individuals or firm, that engages in trading activity via trading system 10 and is not a market maker 22. For example, a customer 24 may be an individual investor, a group of investors, or an institutional investor.

Market makers 22 and customers 24 may place various trading orders 26 via trading platform 18 to trade financial instruments, such as stocks or other equity securities, bonds, mutual funds, options, futures, derivatives, and currencies, for example. Such trading orders 26 may include bid (or buy) orders, ask or offer (or sell) orders, or both, and may be any type of order which may be managed by a trading platform 18, such as market orders, limit orders, stop loss orders, day orders, open orders, GTC ("good till cancelled") orders, "good through" orders, an "all or none" orders, or "any part" orders, for example and not by way of limitation.

Communications network 20 is a communicative platform operable to exchange data or information between trading platform 18 and both market makers 22 and customers 24. Communications network 20 represents an Internet architecture in a particular embodiment of the present invention, which provides market makers 22 and customers 24 with the ability to electronically execute trades or initiate transactions to be delivered to an authorized exchange trading floor. Alternatively, communications network 20 could be a plain old telephone system (POTS), which market makers 22 and/or customers 24 could use to perform the same operations or functions. Such transactions may be assisted by a broker associated with trading platform 18 or manually keyed into a telephone or other suitable electronic equipment in order to request that a transaction be executed. In other embodiments, communications system 14 could be any packet data network (PDN) offering a communications interface or exchange between any two nodes in system 10. Communications network 20 may alternatively be any local area network (LAN), metropolitan area network (MAN), wide area network (WAN), wireless local area network (WLAN), virtual private network (VPN), intranet, or any other appropriate architecture or system that facilitates communications in a network or telephonic environment.

Trading platform 18 is a trading architecture that facilitates the trading of trading orders 26. Trading platform 18 may be a computer, a server, a management center, a single workstation, or a headquartering office for any person, business, or entity that seeks to manage the trading of trading orders 26. Accordingly, trading platform 18 may include any suitable hardware, software, personnel, devices, components, elements, or objects that may be utilized or implemented to achieve the operations and functions of an administrative body or a supervising entity that manages or administers a trading environment.

Trading platform 18 may include a trading module 30 operable to receive trading orders 26 from market makers 22 and customers 24 and to manage or process those trading orders 26 such that financial transactions among and between market makers 22 and customers 24 may be performed. Trading module 30 may have a link or a connection to a market trading floor, or some other suitable coupling to any suitable element that allows for such transactions to be consummated.

As show in FIG. 1, trading module 30 may include a processing unit 32 and a memory unit 34. Processing unit 32 may process data associated with trading orders 26 or otherwise associated with system 10, which may include executing coded instructions that may in particular embodiments be associated with trading module 30. Memory unit 36 may store one or more trading orders 26 received from market makers 22 and/or customers 24. Memory unit 28 may also store a set of trading management rules 36. Memory unit 36 may be coupled to data processing unit 32 and may include one or more databases and other suitable memory devices, such as one or more random access memories (RAMs), read-only memories (ROMs), dynamic random access memories (DRAMs), fast cycle RAMs (FCRAMs), static RAM (SRAMs), field-programmable gate arrays (FPGAs), erasable programmable read-only memories (EPROMs), electrically erasable programmable read-only memories (EEPROMs), microcontrollers, or microprocessors.

It should be noted that the internal structure of trading module 30 may be readily changed, modified, rearranged, or reconfigured in order to perform its intended operations. Accordingly, trading module 30 may be equipped with any suitable component, device, application specific integrated circuit (ASIC), hardware, software, processor, algorithm, read only memory (ROM) element, random access memory (RAM) element, erasable programmable ROM (EPROM), electrically erasable programmable ROM (EEPROM), or any other suitable object that is operable to facilitate the operations of trading module 30. Considerable flexibility is provided by the structure of trading module 30 in the context of trading system 10. Thus, it can be easily appreciated that trading module 30 could be readily provided external to trading platform 18 such that communications involving buyer 16 and seller 18 could still be accommodated and handled properly.

In addition, it should be understood that the functionality provided by communications network 20 and/or trading module 30 may be partially or completely manual such that one or more humans may provide various functionality associated with communications network 20 or trading module 30. For example, a human agent of trading platform 18 may act as a proxy or broker for placing trading orders 26 on trading platform 18.

Trading module 30 may manage and process trading orders 26 based at least on trading management rules 36. Trading management rules 36 may include rules defining how to handle locked and crossed markets, including locked and crossed markets between two or more market makers 22. In some embodiments, trading management rules 36 generally provide that when an order is received from a second market maker 22 that matches or crosses an existing order from a first market maker 22, a trade between the two orders is not automatically executed between the two market makers 22. Instead, in the case of a crossing order, trading module 30 automatically moves the price of the first order to match the contra price of the second order to create a locked market between the two market makers 22. (A contra price for a bid is an ask price, while a contra price for an ask is a bid price.) In addition, in the case of either a matching or crossing order by the second market maker 22, a cross timer is started. If the locked market still exists between the two market makers 22 when the timer expires, trading module 30 automatically executes a trade between the two market makers 22 at the locked price, which is the price most favorable to the first, passive market maker 22. Thus, if a market maker 22 has an existing, passive order that is crossed by an order from another market maker 22, the first market maker 22 has a period of time in which to move its order to avoid a trade being automatically executed with the other market maker 22, which may be particularly advantageous in fast-moving markets.

In a particular embodiment, trading management rules 36 include the following rules:

1. Crossed markets are disallowed. When a new price (i.e., a bid or ask price) is entered by a market maker that would cross an existing price placed by a customer, or vice versa, a trade is executed to avoid a crossed market. When a new price (i.e., a bid or ask price) is entered by one market maker that would cross a contra price previously placed by another market maker: (1) the price previously placed by one market maker is moved to match the price newly entered by first market maker to create a locked market, and (2) a cross timer (which may also be referred to as an auto-execute timer) is started. If the locked market exists between the two market makers at the expiration of the cross timer, a trade is auto-executed between the two market makers at the locked price.

As discussed above, a newly placed bid price crosses an existing ask price if the bid price is greater than the ask price, while a newly placed ask price crosses an existing bid price if the ask price is less than the bid price. For example, suppose a first market maker places a bid-offer of 23-25 and a second market maker subsequently places a bid-offer of 20-21. The ask price submitted by the second market maker (21) is less than the bid price previously submitted by the first market maker (23), and thus the second market maker's ask price crosses the first market maker's bid price. As a result, the first market maker's bid price is moved to 21 to match the newly submitted ask price (such that the first market maker's bid-offer now stands at 21-25) to avoid a crossed market between the first market maker and the second market maker, and a cross timer is started.

2. When a new price (i.e., a bid or ask price) is entered by one market maker that matches a contra price previously placed by another market maker, a locked market is created, and as a result, a cross timer is started. As discussed above, if the locked market exists at the expiration of the cross timer, a trade is auto-executed between the two market makers at the locked price.

3. Trading platform 18 prevents displaying crossed markets to customers. For example, if a crossing bid or offer is received, trading platform 18 will not display the crossing bid or offer until a trade is executed (such as when an order submitted by a trader crosses an order submitted from a market maker) or the crossed bid or offer is moved to create a locked market with the crossing bid or offer (such as when an order submitted by one market maker crosses an order submitted from another market maker).

4. Auto-execute is enabled. In other words, crossed markets trigger an automatic trade, except crossed markets between market makers, which trigger various other rules discussed herein.

5. When a new price (a bid or ask price) is submitted by a second market maker that would cross a contra price previously placed by a first market maker, only the first market maker's price on the crossed side is moved to lock (i.e., match) the price newly entered by second market maker. The price submitted by the second market maker that would cross the contra price previously placed by a first market maker may be referred to as the "crossing price."

(a) If only bids from market makers exist on the new locking side, an auto-execute timer is started for the auto-execution to be delayed.

(b) If a customer's price exists before the crossing price is received from the second market maker and the customer's price locks with the crossing price, a trade is executed without delay (in other words, without being delayed by a timer) between the customer and the second market maker at the locked price against everyone else, including the first market maker.

(c) If a customer's price exists before the crossing price is received from the second market maker and the customer's price doesn't lock with the crossing price, an auto-execute timer is not started, but the crossing price (the aggressive price) is promoted to the customer's price and a trade is auto-executed against the customer's price only on the passive side at the original passive price. For example, suppose a first market maker submits a bid at 18, then a customer submits a bid at 18, and then a second market maker submits an offer at 17. The first market maker's bid is moved to 17 and a trade is auto-executed between the customers bid and the second market makers offer at the price of 18, all without a cross timer being started.

6. There can be only one outstanding auto-execute timer per instrument.

7. The auto-execute timer exists for a locked market only. As discussed above, a locked market exists when a price submitted by one market maker matches a contra price submitted by another market maker.

8. The auto-execute timer is cancelled if the locked market is removed, such as when one of the prices underlying the locked/choice market is moved.

9. After the auto-execute timer elapses, the system executes aggressively on behalf of the market maker crossing. In other words, the system auto-executes a trade between the first market maker and the second market maker.

10. If after a locked market is created between two market makers, a customer's price is subsequently entered at the locked level, the system will auto-execute a trade against everyone (including market makers) on the passive side at that locked price, no auto-execute timer will be started and any pending auto-execute timer will be cancelled. The customer's order that catalyzed this trade will trade first.

11. Any new crossing price from a market maker will cancel any pending auto-execute timer, and start a new auto-execute timer.

12. During a trade, received crossing prices will just be rejected. Customer and market maker prices entered at the trading price during a trade will be elevated to aggressive buy or sell orders, and join in the trade.

13. A trade (buy or sell) between a customer and a market maker that would naturally take place will cancel any pending auto-execute timer. For example, suppose a first market maker submits a bid-ask order at 18-20, and a second market maker submits a bid-ask order at 15-17. The first market maker's bid is automatically reduced to 17 match the second market maker's offer (according to Rule 1), which creates a locked market at 17, and a cross-timer is started. If before the cross-timer has expired, a customer submits a bid at 18 (which would naturally trigger a trade between the customer and the second market maker), the cross-timer is cancelled and a trade is auto-executed between the customer and the second market maker at the locked price of 17.

14. The sequencing of existing orders will be maintained during a market maker price movement (either up or down) as a result of crossed markets. If two or more existing market maker same-side prices are to be moved and re-entered due to a crossing contra price received from another market maker, each of the existing market maker orders is moved in price order, and then in time order (for orders at the same price). Each newly moved market maker order is given a new timestamp as it is moved. Existing customer limit orders are not pushed down a bid or offer sequence in favor of a newly moved market maker order. To prevent this from occurring, the newly moved market maker orders are re-ordered as they are moved (with the most aggressive market maker order—e.g., the highest bid or the lowest offer for a normally-priced instrument such as a stock—receiving its new timestamp first), and placed below any orders existing already at the price to which the newly moved market maker were moved.

15. Since market makers may believe they are, or intend to be, always passive, market maker API accounts may be set up such that the brokerage fees for all market maker transactions (both passive and aggressive) are the same.

16. The cross timer may be dynamically adjustable to account for market volatility.

17. The length of the cross timer used for different instruments may differ, and may be based on one or more parameters associated with the instrument, such as the volatility, current price, or average trading volume associated with that instrument, for example. In some embodiments, trading module 30 may determine an appropriate length for cross timers for different instruments based on such parameters. In addition, the cross timer for each instrument may be independently adjusted. For example, trading module 30 may increase the length of the cross timer for a particularly volatile instrument automatically in response to data regarding the volatility of the instrument, or in response to feedback from market makers 22 wishing to increase the delay for adjusting their trading orders 26 for that instrument.

It should be understood that set of trading management rules 36 listed above apply to a particular embodiment and that in other embodiments, the trading management rules 36 applied by trading module 30 may include a portion of the rules listed above, additional rules (one or more of which may be alternatives or modifications of the rules listed above), or any combination thereof.

In addition, it should be understood that in some embodiments, the trading management rules 36 applied by trading module 30 may be equally or similarly applied to numerically-inverted instruments in which bids are higher in price (although lower in value) than corresponding offers. For example, bonds (such as US Treasury "when-issued" bills, for example) are typically numerically-inverted instruments because bond prices are typically inversely related to bond yields. In other words, the going bid price of a bond is numerically higher than the going offer price for the bond.

Figure 2:
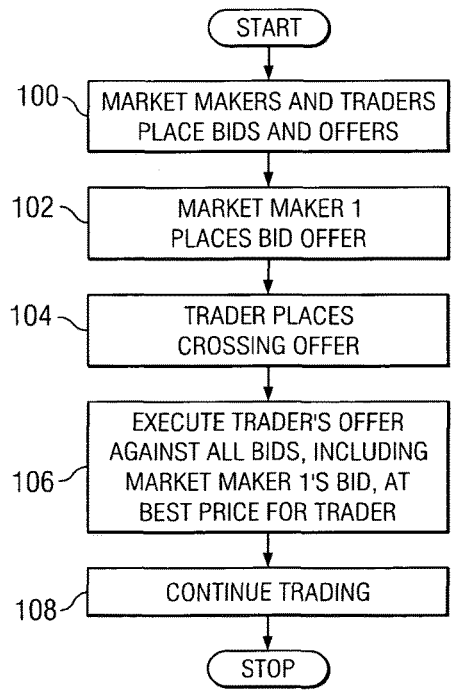
FIG. 2 illustrates a method of handling a crossing offer received from a customer according to one embodiment of the invention.
Figure 3:
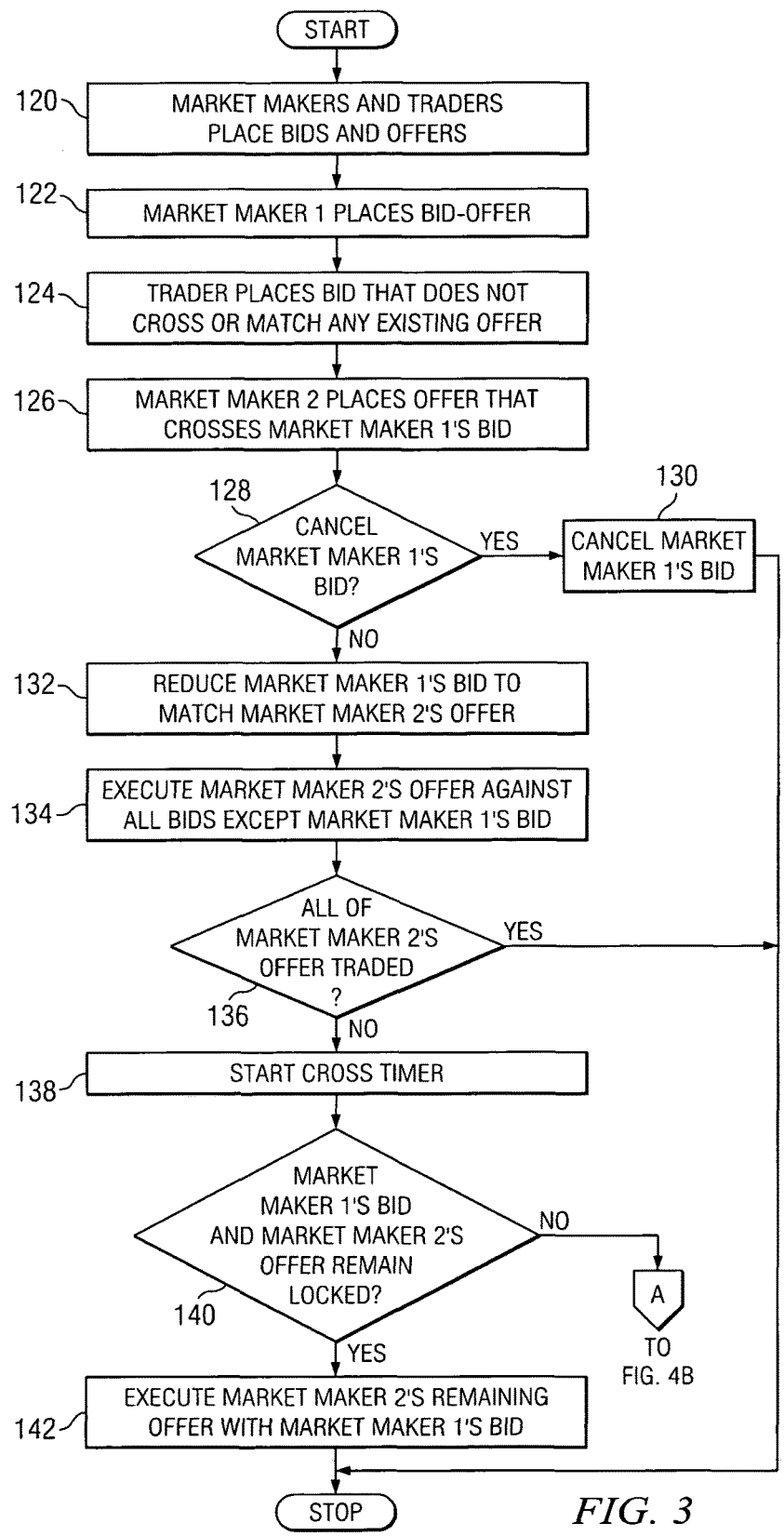
FIG. 3 illustrates a method of handling a crossing offer received from a market maker assuming the bid side contains both market makers and customers, according to one embodiment of the invention.

FIGS. 2 through 4 illustrate example methods for handling trading orders in a variety of situations using trading system 10, including applying various trading management rules 36 discussed above. FIG. 2 illustrates a method of handling a crossing offer received from a customer 24 according to one embodiment of the invention. At step 100, various orders 22, including bid and offer (or ask) orders, are received for a particular instrument 24, thus establishing a market for that instrument 24. Such orders 22 may be received by both market makers 22 and customers 24. At step 102, a first market maker 22, MM1, submits a bid-offer price spread for instrument 24 to trading platform 18. At step 104, a customer 24 places an offer order which crosses the bid price submitted by MM1. At step 106, trading module 30 auto-executes the customer's 28 offer against all existing bids, including MM1's bid, at the best price for the customer 24. At step 108, trading may continue. It should be understood that the method of FIG. 2 may be similarly applied to handle a crossing bid received from a customer 24, such as where a customer 24 places an bid order which crosses the offer price submitted by a market maker 22.

To better understand the method shown in FIG. 2, suppose MM1 submits a bid-offer price spread of 12-14 (of sizes 5 by 5) for a stock at step 102. At step 104, a customer places an offer order at a price of 11 (of size 5) for the stock, which crosses the bid price (12) submitted by MM1. At step 106, trading module 30 auto-executes the customer's offer against all existing bids, including MM1's bid of 12, at the best price for the customer. Assuming MM1's bid of 12 is the highest existing bid for the stock, trading module 30 auto-executes a trade of 5 shares between the customer and MM1 at a price of 12.

FIG. 3 illustrates a method of handling a crossing offer received from a market maker 22 assuming the bid side contains both market makers 22 and customers 24, according to one embodiment of the invention. At step 120, various orders 22, including bid and offer orders, are received for a particular instrument 24, thus establishing a market for that instrument 24. Such orders 22 may be received by both market makers 22 and customers 24. At step 122, a first market maker 22, MM1, submits a bid-offer price spread for instrument 24 to trading platform 18. At step 124, a customer 24 places a bid for instrument 24 that does not cross or match any current offer, and thus does not trigger a trade. At step 126, a second market maker 22, MM2, submits a bid-offer price spread for instrument 24 including an offer which crosses MM1's bid price.

At step 128, trading module 30 determines whether to cancel MM1's bid. In one embodiment, trading module 30 cancels MM1's bid if (a) the bid is not a limit bid and (b) moving the bid to match MM2's offer price would move the bid below another existing bid. If trading module 30 determines to cancel MM1's bid, the bid is cancelled at step 130. Alternatively, if trading module 30 determines not to cancel MM1's bid, MM1's bid is moved to match MM2's offer price at step 132 to prevent a cross market between MM1 and MM2. At step 134, trading module 30 auto-executes MM2's offer against all existing bids, excluding MM1's moved bid, at the best price for MM2. MM2's offer may be auto-executed against customers' bids, as well as bids received from market makers if (a) MM2's offer matched the price of such market maker bids and (b) customers' bids are also present.

At step 136, it is determined whether all of MM2's offer was traded at step 134. If so, the method stops. However, if any portion of MM2's offer remains after the executed trade(s) at step 134, a cross timer starts for MM1's moved bid at step 138. At step 140, the cross timer runs. If MM1's moved bid and the remaining portion of MM2's offer remain locked when the cross timer expires, the remaining portion of MM2's offer is auto-executed with MM1's moved bid at step 142. Alternatively, any of a variety of events may cause the locked relationship between MM1's moved bid and MM2's offer to terminate before the cross timer expires, such as MM1 moving its bid price, MM2 moving its offer, MM2's offer being matched and executed by another bid, or MM1's bid or MM2's offer being withdrawn, for example. Such situations are discussed in more detail below with reference to FIG. 4. It should be understood that the method of FIG. 3 may be similarly applied to handle a crossing bid received from a market maker 22, such as where a market maker 22 places an bid order which crosses the offer price previously submitted by another market maker 22.

To better understand the method shown in FIG. 3, suppose MM1 submits a bid-offer price spread of 35-37 (of sizes 5 by 10) for a stock at step 122. At step 124, a customer places a bid order for the stock at a price of 35 (of size 5) that does not cross or match any current offer, and thus does not trigger a trade. At step 126, MM2 submits a bid-offer price spread of 32-33 (of sizes 8 by 10) for the stock. MM2's offer price of 33 crosses MM1's bid price of 35.

Assume that at step 128, trading module 30 determines not to cancel MM1's bid. Thus, at step 132, MM1's bid is reduced from 35 to 33 to match MM2's offer price of 33. At step 134, trading module 30 auto-executes MM2's offer at 33 against all existing bids, excluding MM1's moved bid, at the best price for MM2. Assuming that the customer's bid at 35 is the highest existing bid price, trading module 30 auto-executes a trade at a price of 35 between 5 of the 10 shares offered by MM2's offer and the bid for 5 shares by the customer. MM2's existing bid-offer now reads 32-33 (of sizes 8 by 5). At step 136, it is determined that a portion of MM2's offer—namely, 5 shares—remains after the executed trade at step 134, and thus a cross timer starts for MM1's moved bid (price=33) at step 138. At step 140, the cross timer runs. If MM1's moved bid (price=33) and the remaining portion of MM2's offer (price=33) remain locked when the cross timer expires, the remaining 5 shares of MM2's offer is auto-executed with the 5 shares of MM1's moved bid at the price of 33 at step 142. Alternatively, if the locked relationship between MM1's moved bid and MM2's offer terminated before the cross timer expired, various consequences may occur, as discussed in more detail below with reference to FIG. 4.

Figure 4A:
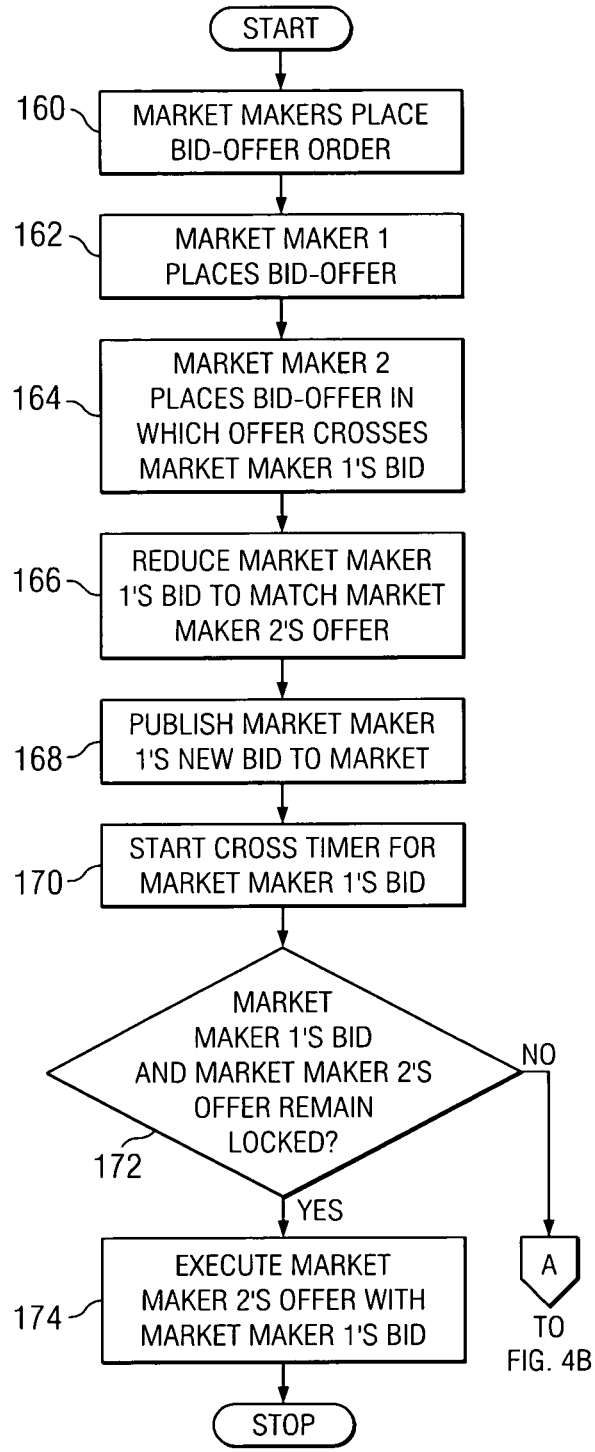
FIGS. 4A-4B illustrate a method of handling a crossing offer received from a market maker assuming the bid side contains only market makers, according to one embodiment of the invention.
Figure 4B:
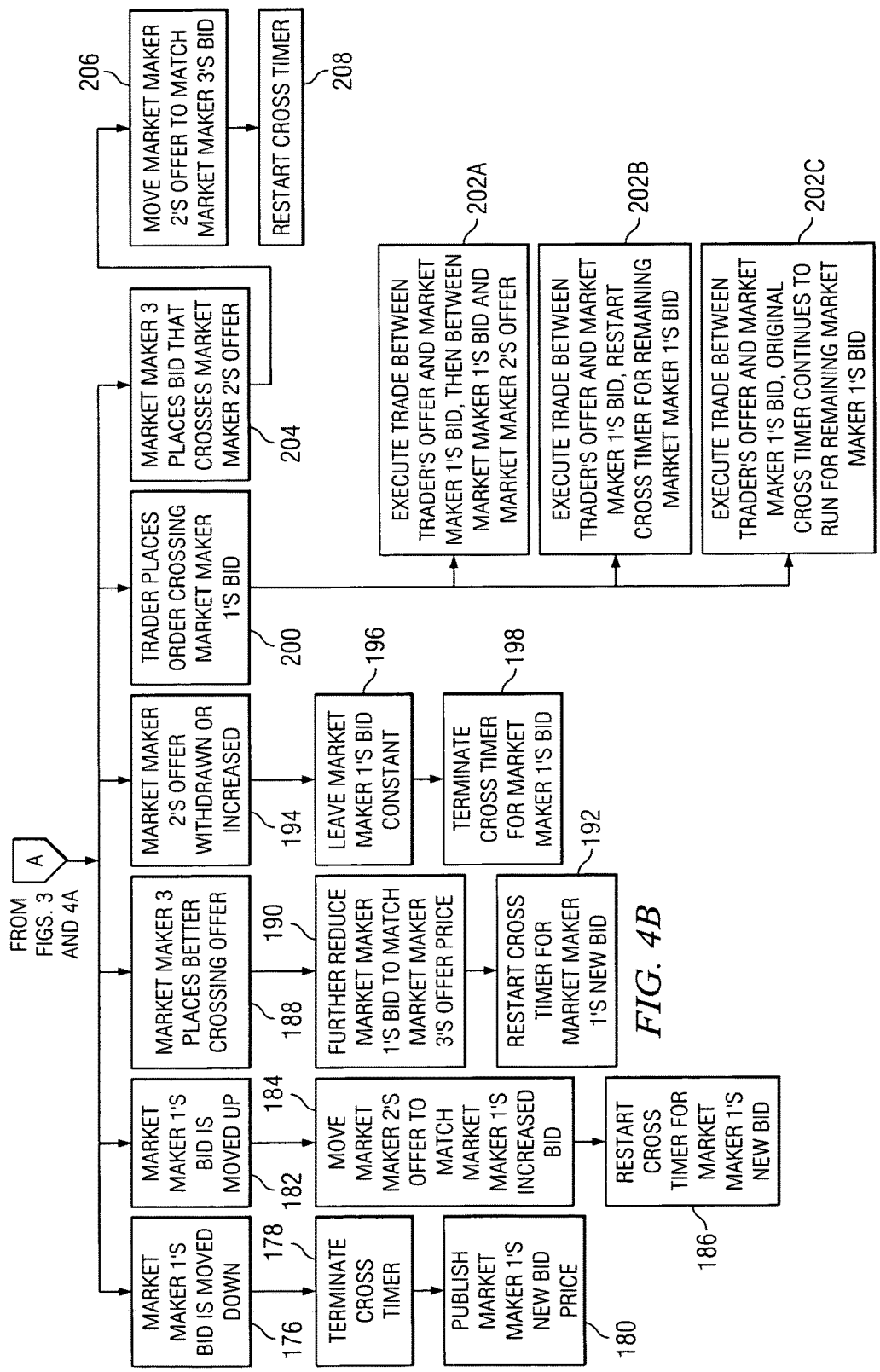

FIGS. 4A-4B illustrate a method of handling a crossing offer received from a market maker 22 assuming the bid side contains only market makers 22, according to one embodiment of the invention. As shown in FIG. 4A, at step 160, various orders 22, including bid and offer orders, are received from one or more market makers 22 for a particular instrument 24, thus establishing a market for that instrument 24. At step 162, a first market maker 22, MM1, submits a bid-offer price spread for instrument 24 to trading platform 18. At step 164, a second market maker 22, MM2, submits a bid-offer price spread for instrument 24 including an offer which crosses MM1's bid price. At step 166, trading module 30 moves MM1's bid price to match MM2's offer price to prevent a cross market between MM1 and MM2. At step 168, trading module 30 publishes MM1's newly moved bid in the market data. Thus, trading module 30 may avoid publishing a crossed market. At step 170, trading module 30 starts a cross timer for MM1's newly moved bid.

At step 172, the cross timer runs. During the duration of the cross timer, MM1's bid can only be traded against an offer from a customer, not another market maker, including MM2. If MM1's moved bid and the remaining portion of MM2's offer remain locked when the cross timer expires, MM2's offer is auto-executed with MM1's moved bid at step 174. Alternatively, any of a variety of events may cause the locked relationship between MM1's moved bid and MM2's offer to terminate before the cross timer expires, such as MM1 moving its bid price, MM2 moving its offer, MM2's offer being matched and executed by another bid, or MM1's bid or MM2's offer being withdrawn, for example. Such situations are shown in FIG. 4B and discussed below with reference to steps 176 through 204.

First, suppose MM1's bid is moved down (either by MM1 or otherwise) during the duration of the cross timer at step 176 such that MM1's bid and MM2's offer are neither crossed nor locked. In response, the cross timer is terminated at step 178 and the new bid price is published to the market at 180.

Second, suppose MM1's bid is moved up (either by MM1 or otherwise) during the duration of the cross timer (such as during re-aging) at step 182. In response, trading module 30 moves MM2's offer to match MM1's newly increased bid at step 184, and the cross timer is restarted for MM1's bid at this new locked price at step 186. Thus, the method may return to step 172.

Third, suppose a third market maker 22, MM3, submits a better crossing offer than MM2's offer during the duration of the cross timer at step 188. In other words, MM3's offer is at a lower price than MM2's offer. In response to MM3's offer, trading module 30 further reduces MM1's bid to match MM3's offer price at step 190, and cancel the running cross timer and start a new cross timer for MM1's newly reduced bid at step 192. Thus, the method may return to step 172.

Fourth, suppose at step 194, MM2 withdraws it's crossing offer which was placed at step 164, or amends the offer to a higher price, during the duration of the cross timer. In response, MM1's bid remains constant at step 196, and the cross timer for MM1's bid is terminated at step 198. A "normal" (i.e., not crossed or locked) bid-offer state now exists.

Fifth, suppose at step 200, a customer 24 submits an offer that crosses MM1's bid, or moves an existing offer to a price that crosses MM1's bid, during the duration of the cross timer. This situation may be handled in several different ways, depending on the particular embodiment. In one embodiment, shown at step 202A, trading module 30 first executes a trade between the customer's offer and MM1's bid at the locked price, and then executes a trade between remaining shares (if any) of MM1's bid and MM2's offer at the locked price without waiting for the cross timer to expire.

In another embodiment, shown at step 202B, trading module 30 executes a trade between the customer's offer and MM1's bid and restarts the cross timer for any remaining shares of MM1's bid, if any. Thus, the method may return to step 172. In yet another embodiment, shown at step 202C, trading module 30 executes a trade between the customer's offer and MM1's and the cross timer for any remaining shares of MM1's bid, if any, continues to run (i.e., the cross timer is not reset).

Sixth, suppose at step 204, a third market maker 22, MM3, submits a bid during the duration of the cross timer that crosses (i.e., is higher than) the locked price of MM1's bid and MM2's offer. In response, trading module 30 moves MM2's offer to match MM3's bid price at step 206, and restarts a cross timer for MM2's offer at step 208.

As discussed with regard to the methods of FIGS. 2 and 3, it should be understood that the method of FIG. 4 may be similarly applied whether the crossing order is a bid or an offer. In particular, the method of FIG. 4 may be similarly applied to handle a crossing bid received from a market maker 22 where the offer side contains only market makers 22.

To better understand the method shown in FIG. 4, suppose NM1 submits a bid-offer price spread of 12-14 (of sizes 10 by 10) for a stock at step 162. At step 164, MM2 submits a bid-offer price spread of 9-11 (of sizes 5 by 5) for the stock. MM2's offer price of 11 thus crosses MM1's bid price of 12. At step 166, trading module 30 moves MM1's bid price from 12 to 11 to match MM2's offer price to prevent a cross market between MM1 and MM2. At step 168, trading module 30 starts a cross timer for MM1's bid at the price of 11. At step 170, trading module 30 publishes MM1's newly moved bid such that the published bid-ask spread is 11-11.

At step 172, the cross timer runs. If MM1's moved bid and the remaining portion of MM2's offer remain locked when the cross timer expires, MM2's offer is traded with MM1's moved bid at the price of 11 at step 174. Alternatively, as discussed above, any of a variety of events may cause the locked relationship between MM1's moved bid and MM2's offer to terminate before the cross timer expires.

First, suppose MM1 moves its bid price down from 11 to 10 at step 176 such that MM1's bid (at 10) and MM2's offer (at 11) are no longer crossed nor locked. In response, the cross timer is terminated at step 178 and MM1's new bid price of 10 is published to the market at 180.

Second, suppose MM1's bid price is moved up from 11 to 12 at step 182. In response, trading module 30 moves MM2's offer price from 11 to 12 to match MM1's newly increased bid at step 184, and the cross timer is restarted at this new locked price at step 186. Thus, the method may return to step 172.

Third, suppose at step 188, MM3 submits a crossing offer at the price of 10, which betters MM2's offer at 11. In response, trading module 30 reduces MM1's bid from 11 to 10 to match MM3's offer price at step 190. Trading module 30 then cancels the running cross timer and starts a new cross timer for MM1's newly reduced bid at the price of 10 at step 192. Thus, the method may return to step 172.

Fourth, suppose at step 194, MM2 withdraws it's crossing offer (at the price of 11) which was placed at step 164, or amends the offer from 11 to 12. In response, MM1's bid remains constant at 11 at step 196, and the cross timer for MM1's bid is terminated at step 198. A "normal" (i.e., not crossed or locked) bid-offer state now exists.

Fifth, suppose at step 200, a customer 24 submits an offer of 5 shares at the price of 9, which crosses MM1's bid at 11. As discussed above, this situation may be handled differently depending on the particular embodiment. In the embodiment shown at step 202A, trading module 30 first executes a trade between the 5 shares of the customer's offer and 5 of the 10 shares of MM1's bid at the locked price of 11, and then executes a trade between the remaining 5 shares of MM1's bid and the 5 shares of MM2's offer at the locked price of 11 without waiting for the cross timer to expire. In the embodiment shown at step 202B, trading module 30 executes a trade between the 5 shares of the customer's offer and 5 of the 10 shares of MM1's bid at the locked price of 11, and resets the cross timer for the remaining 5 shares of MM1's bid. In the embodiment shown at step 202C, trading module 30 executes a trade between the 5 shares of the customer's offer and 5 of the 10 shares of MM1's bid at the locked price of 11, and the cross timer for MM1's bid continues to run for the remaining 5 shares of MM1's bid.

Sixth, suppose at step 204, MM3 submits a bid at the price of 12, which crosses (i.e., is higher than) the locked price of MM1's bid and MM2's offer at 11. In response, trading module 30 moves MM2's offer (as well as any other market maker offers at the locked price) to 12 to match MM3's bid price at step 206, and restarts a cross timer for MM2's offer at step 208.

Modifications, additions, or omissions may be made to the method without departing from the scope of the invention. Additionally, steps may be performed in any suitable order without departing from the scope of the invention.

Although an embodiment of the invention and its advantages are described in detail, a person skilled in the art could make various alterations, additions, and omissions without departing from the spirit and scope of the present invention as defined by the appended claims.

What is claimed is:

1. A method, comprising the steps of:
    by at least one computer of an electronic trading system, determining whether received orders to trade an instrument are placed via graphical user interfaces of computer terminals of market-makers, the received orders comprising a bid order for the instrument and an offer order for the instrument;
    by the at least one computer of the electronic trading system, determining whether the bid order for the instrument crosses price with the offer order for the instrument;
    by the at least one computer of the electronic trading system, enabling an auto-execute mode to automatically execute trades in crossed markets except crossed markets between market makers;
    (1) based at least in part on a determination by the at least one computer of the electronic trading system that a price of a bid order crosses the price of an offer order, and that the crossed orders are each from market makers, automatically preventing execution of the crossed market maker orders against each other, creating a locked market for the crossed market maker orders, disabling display at interfaces of terminals of customers of data representing the crossed market maker orders, and automatically starting a timer delaying execution of the crossed market maker orders against each other for a period of time, and automatically by the at least one computer of the electronic trading system taking at least one of the following actions (a), (b) and (c):
        (a) adjusting a price of at least one of the crossed market maker orders to match the price of the other crossed market maker order, and publishing the adjusted price order to the market for execution by non-market makers while not executing the market makers' orders against each other;
        (b) adjusting the price of at least one of the crossed market maker orders to match the price of the other crossed market maker order, and executing the adjusted price order against any matching orders from non-market maker traders, while not executing the market makers' orders against each other; and
        (c) responsive to determining that the crossed market maker orders remain matching or crossed at expiry of the timer, the crossed market maker orders comprising an earlier-received order and a later-received order, automatically causing to be executed the two market maker orders against each other at the price of the later order;
    (2) determining that a later of two crossed orders is from a market maker and an earlier of the two crossed orders is from a non-market-maker;
    (3) executing a trade between the two crossed orders at a price of the earlier non-market-maker order,
    wherein brokerage fees for any market makers who submitted orders that were executed are configured such that the brokerage fees are the same whether the market maker is on a passive side of the transaction or an aggressive side of the transaction; and
    enabling display, at interfaces of terminals of the customers, data representing the crossed market maker orders upon execution of the crossed market makers orders.

2. A method, comprising the steps of:
    by at least one computer of an electronic trading system, determining whether received orders to trade an instrument orders are placed via graphical user interfaces of computer terminals of market-makers, the received orders comprising a bid order for the instrument and an offer order for the instrument;
    by the at least one computer of the electronic trading system, determining whether the bid order for the instrument crosses price with the offer order for the instrument;
    by the at least one computer of the electronic trading system, enabling an auto-execute mode to automatically execute trades in crossed markets except crossed markets between market makers;
    based on a determination by the at least one computer of the electronic trading system that a price of a bid order crosses the price of an offer order, and that the crossed orders are each from market makers, automatically preventing execution of the crossed market maker orders against each other, creating a locked market for the crossed market maker orders, disabling display at interfaces of terminals of customers of data representing the crossed market maker orders, and automatically taking at least one of the following actions (a), (b), and (c):
        (a) adjusting a price of at least one of the crossed market maker orders to match the price of the other crossed market maker order, and publishing the adjusted price order to the market for execution by non-market makers while not executing the market makers' orders against each other;
        (b) adjusting the price of at least one of the crossed market maker orders to match the price of the other crossed market maker order, and executing the adjusted price order against any matching orders from non-market maker traders, while not executing the market makers' orders against each other;
        (c) starting a timer delaying execution of the crossed market maker orders against each other for a period of time, and if the crossed market maker orders remain matching or crossed at expiry of the timer, automatically causing to be executed the two market maker orders against each other; and
    enabling display, at interfaces of terminals of the customers, data representing the crossed market maker orders upon execution of the crossed market makers orders.

3. The method of claim 2, wherein the act of taking at least one of actions (a), (b), and (c) comprises one of the act of taking the actions:

(a) adjusting the price of at least one of the crossed market maker orders to match the price of the other crossed market maker order, and publishing the adjusted price order to the market for execution by non-market makers while not executing the market makers' orders against each other; and (b) adjusting the price of at least one of the crossed market maker orders to match the price of the other crossed market maker order, and executing the adjusted price order against any matching orders from non-market maker traders, while not executing the market makers' orders against each other.

4. The method of claim 2, wherein the act of taking at least one of actions (a), (b), and (c) comprises the act of taking the action:

(b) adjusting the price of at least one of the crossed market maker orders to match the price of the other crossed market maker order, and executing the adjusted price order against any matching orders from non-market maker traders, while not executing the market makers' orders against each other.

5. The method of claim 4, further comprising:

by the at least one computer of the electronic trading system, determining that a second bid order for the instrument crosses price with a second offer order for the instrument; and based at least in part on a determination by the at least one computer of the electronic trading system that a price of a second bid order crosses the price of a second offer order, performing one of:

(a) responsive to determining that both the second bid and the second offer are from market makers or that both the second bid and the second offer are from non-market makers, in which one of the second bid and second offer comprises a later order that was received later than the other of the second bid and second offer, executing a trade between the second bid and the second offer at the price of the later order; and (b) responsive to determining that the later of the second bid and the second offer is from a market maker and the earlier of the second bid and the second offer is from a non-market-maker, executing a trade between the second bid and the second offer at the price of the earlier of the second bid and the second offer.

6. The method of claim 4, wherein brokerage fees for any market makers who submitted orders that were executed are configured such that the brokerage fees are the same whether the market maker is on a passive side of the transaction or an aggressive side of the transaction.

7. The method of claim 2, wherein the act of taking at least one of actions (a), (b), and (c) comprises the act of taking the action:

(b) adjusting the price of at least one of the crossed market maker orders to match the price of the other crossed market maker order, and executing the adjusted price order against any matching orders from non-market maker traders, while not executing the market makers' orders against each other.

8. The method of claim 7, further comprising:

by the at least one computer of the electronic trading system, determining that a second bid order for the instrument crosses price with a second offer order for the instrument; and based at least in part on a determination by the at least one computer of the electronic trading system that a price of a second bid order crosses the price of a second offer order, performing one of:

(a) responsive to determining that both the second bid and the second offer are from market makers or that both the second bid and the second offer are from non-market makers, in which one of the second bid and second offer comprises a later order that was received later than the other of the second bid and second offer, executing a trade between the second bid and the second offer at the price of the later order; and (b) responsive to determining that the later of the second bid and the second offer is from a market maker and the earlier of the second bid and the second offer is from a non-market-maker, executing a trade between the second bid and the second offer at the price of the earlier of the second bid and the second offer.

9. The method of claim 3, wherein:

the act of adjusting a price comprises changing the price of the earlier of the crossed market maker orders to match the price of the later of the crossed market maker orders.

10. The method of claim 9, further comprising:

by the at least one computer of the electronic trading system, determining that a second bid order for the instrument crosses price with a second offer order for the instrument; and based at least in part on a determination by the at least one computer of the electronic trading system that a price of a second bid order crosses the price of a second offer order, performing one of:

(a) responsive to determining that both the second bid and the second offer are from market makers or that both the second bid and the second offer are from non-market makers, in which one of the second bid and second offer comprises a later order that was received later than the other of the second bid and second offer, executing a trade between the second bid and the second offer at the price of the later order; and (b) responsive to determining that the later of the second bid and the second offer is from a market maker and the earlier of the second bid and the second offer is from a non-market-maker, executing a trade between the second bid and the second offer at the price of the earlier of the second bid and the second offer.

11. The method of claim 9, wherein brokerage fees for any market makers who submitted orders that were executed are configured such that the brokerage fees are the same whether the market maker is on a passive side of the transaction or an aggressive side of the transaction.

12. The method of claim 3, further comprising the step of:

assigning a new priority time stamp to the at least one of the crossed market orders whose price is adjusted.

13. The method of claim 2, wherein the act of taking at least one of actions (a), (b), and (c) comprises the act of taking the action:

(c) starting a timer delaying execution of the crossed market maker orders against each other for a period of time, and if the crossed market maker orders remain matching or crossed at expiry of the timer, automatically causing to be executed the two market maker orders against each other.

14. The method of claim 13, further comprising the step of:
by the at least one computer of the electronic trading system, determining that a second bid order for the instrument crosses price with a second offer order for the instrument; and
based at least in part on a determination by the at least one computer of the electronic trading system that a price of a second bid order crosses the price of a second offer order, performing one of:
(a) responsive to determining that both the second bid and the second offer are from market makers or that both the second bid and the second offer are from non-market makers, in which one of the second bid and second offer comprises a later order that was received later than the other of the second bid and second offer, executing a trade between the second bid and the second offer at the price of the later order; and
(b) responsive to determining that the later of the second bid and the second offer is from a market maker and the earlier of the second bid and the second offer is from a non-market-maker, executing a trade between the second bid and the second offer at the price of the earlier of the second bid and the second offer.

15. The method of claim 13, further comprising the step of:
preventing two market maker orders from being executed against each other responsive to a determination that the price of either of the crossed or matching market maker orders is moved before the timer expires, resulting in the orders no longer being crossed or matching.

16. The method of claim 13, wherein the act of taking at least one of actions (a), (b), and (c) further comprises the act of taking the action: automatically taking at least one of the following actions (a) and (b):
(a) adjusting a price of at least one of the crossed market maker orders to match the price of the other crossed market maker order, and publishing the adjusted price order to the market for execution by non-market makers while not executing the market makers' orders against each other; or
(b) adjusting the price of at least one of the crossed market maker orders to match the price of the other crossed market maker order, and causing to be executed the adjusted price order against any matching orders from non-market maker traders, while not executing the market makers' orders against each other.

17. The method of claim 16, further comprising the step of:
preventing the crossed market maker orders from being executed against one another responsive to a determination that, before the timer expires, an order is received at the electronic trading system from a non-market-maker customer, the price of the non-market-maker order being equal to or more favorable to the market maker whose crossed order was not modified than is the price of the other crossed market maker order.

18. The method of claim 16, further comprising the step of:
responsive to determining that, before the timer expires, an order is received at the electronic trading system from a non-market-maker customer at a price executable against either of the crossed non-market-maker orders, executing the non-market-maker order against the executable market maker order without said execution being delayed by a timer.

19. The method of claim 18, further comprising the step of:
after executing the non-market-maker order against the executable market maker order, automatically (a) canceling at least one of the crossed market maker orders or (b) moving a price of at least one of the crossed market maker orders.

20. The method of claim 13, wherein:
the duration of the timer varies by instrument traded on the electronic trading system.

21. The method of claim 13, wherein:
the duration of the timer varies with market volatility in the instrument.

22. The method of claim 13, wherein:
the duration of the timer varies with one or more of current price level and average trading volume.

23. The method of claim 2, wherein the act of taking at least one of actions (a), (b), and (c) comprises the act of taking the action:
(c) starting a timer delaying execution of the locked or crossed market maker orders against each other for a period of time, and responsive to determining that the crossed market maker orders remain matching at expiry of the timer, automatically the two market maker orders against each other.

24. The method of claim 2, further comprising:
by the at least one computer of the electronic trading system, determining that a second bid order for the instrument crosses price with a second offer order for the instrument; and
based at least in part on a determination by the at least one computer of the electronic trading system that a price of a second bid order crosses the price of a second offer order, performing one of:
(a) responsive to determining that both the second bid and the second offer are from market makers or that both the second bid and the second offer are from non-market makers, in which one of the second bid and second offer comprises a later order that was received later than the other of the second bid and second offer, executing a trade between the second bid and the second offer at the price of the later order; and
(b) responsive to determining that the later of the second bid and the second offer is from a market maker and the earlier of the second bid and the second offer is from a non-market-maker, executing a trade between the second bid and the second offer at the price of the earlier of the second bid and the second offer;
wherein brokerage fees for any market makers who submitted orders that were executed are configured such that the brokerage fees are the same whether the market maker is on a passive side of the transaction or an aggressive side of the transaction.

25. A method, comprising the steps of:
by at least one computer of an electronic trading system, determining whether received orders to trade an instrument are placed via graphical user interfaces of computer terminals of market-makers, the received orders comprising a bid order for the instrument and an offer order for the instrument;

by the at least one computer of the electronic trading system, determining whether the bid order for the instrument locks or crosses price with the offer order for the instrument;

by the at least one computer of the electronic trading system, enabling an auto-execute mode to automatically execute trades in crossed markets except crossed markets between market makers; and based on a determination by the at least one computer of the electronic trading system (1) that a price of a bid order crosses the price of an offer order, and (2) that the crossed orders are each from market makers, automatically preventing execution of the crossed market maker orders against each other, creating a locked market for the crossed market maker orders, disabling display at interfaces of terminals of customers of data representing the crossed market maker orders, and automatically starting a timer delaying execution of the crossed market maker orders against each other for a period of time; and responsive to determining that the crossed market maker orders are matching at expiry of the timer, automatically executing the two market maker orders against each other; and enabling display, at interfaces of terminals of the customers, data representing the crossed market maker orders upon execution of the crossed market makers orders.

26. The method of claim 25, wherein the act of determining whether a bid order for the instrument crosses price with an offer order for the instrument comprises determining that a bid order for the instrument crosses price with an offer order for the instrument such that the bid and offer are crossed orders with respect to one another, wherein the act of determining whether the orders are placed by market-makers comprises determining that the crossed orders are each from market makers, further comprising:

based at least in part on the determination that a price of a bid crosses the price of an offer, and that the crossed orders are each from market makers, automatically taking at least one of the following actions (a), (b), and (c):

(a) adjusting a price of at least one of the crossed market maker orders to match the price of the other crossed market maker order, and publishing the adjusted price order to the market for execution by non-market makers while not executing the market makers' orders against each other;

(b) adjusting the price of at least one of the crossed market maker orders to match the price of the other crossed market maker order, and executing the adjusted price order against any matching orders from non-market maker traders, while not executing the market makers' orders against each other; and (c) automatically executing the two market maker orders against each other.

27. The method of claim 26, further comprising the step of:

based at least in part on a determination by the at least one computer of the electronic trading system that a price of a bid order crosses the price of an offer order, handling the crossed orders:

(a) responsive to determining that both crossed orders are from market makers or that both crossed orders are from non-market makers, in which one of the second bid and second offer comprises a later order that was received later than the other of the second bid and second offer, executing a trade between the crossed orders at the price of the later order; and (b) responsive to determining that the later crossed order is from a market maker and the earlier crossed order is from a non-market-maker, executing a trade between the crossed orders at the price of the earlier non-market-maker order;

wherein brokerage fees for any market makers who submitted orders that were executed are configured such that the brokerage fees are the same whether the market maker is on a passive side of the transaction or an aggressive side of the transaction.

28. The method of claim 25, further comprising the step of:

based at least in part on a determination by the at least one computer of the electronic trading system that a price of a bid crosses the price of an offer, and that the crossed orders are each from market makers, automatically adjusting a price of at least one of the crossed market maker orders to match the price of the other crossed market maker order, and publishing the adjusted price order to the market for execution by non-market makers while not executing the market makers' orders against each other.

29. The method of claim 25, further comprising the step of:

based at least in part on a determination by the at least one computer of the electronic trading system that a price of a bid crosses the price of an offer, and that the crossed orders are each from market makers, automatically adjusting the price of at least one of the crossed market maker orders to match the price of the other crossed market maker order, and executing the adjusted price order against any matching orders from non-market maker traders, while not executing the market makers' orders against each other.

30. The method of claim 25, wherein the act of determining whether a bid order for the instrument locks or crosses price with an offer order for the instrument comprises determining that a bid order for the instrument crosses price with an offer order for the instrument, and wherein the act of determining whether the orders are placed by market-makers comprises determining that the crossed orders are each from market makers.

31. The method of claim 25, further comprising the step of:

during the period of the timer, automatically comparing the crossed market maker orders against orders from non-market maker traders, and if a non-market maker order matches one of the crossed market maker orders, and automatically executing a trade between the matching non-market maker order and the matched crossed market maker order.

32. The method of claim 31, further comprising the step of:

after executing the trade between the matching non-market maker order and the matched crossed market maker order, executing any remainder of the crossed market maker orders against each other without awaiting expiry of the timer.

33. The method of claim 31, further comprising the step of:

during the period of the timer, if any further market maker order is received at a price at which market makers lock, automatically executing orders at the locked price, without waiting expiry of the timer.

34. The method of claim 25, further comprising the step of:
based at least in part on a determination by the at least one computer of the electronic trading system that a price of a bid order crosses the price of an offer order, handling the crossed orders:
(a) if both crossed orders are from market makers or that both crossed orders are from non-market makers, in which one of the second bid and second offer comprises a later order that was received later than the other of the second bid and second offer, executing a trade between the crossed orders at the price of the later order; and
(b) if the later crossed order is from a market maker and the earlier crossed order is from a non-market-maker, executing a trade between the crossed orders at the price of the earlier non-market-maker order.

35. The method of claim 25, wherein brokerage fees for any market makers who submitted orders that were executed are configured such that the brokerage fees are the same whether the market maker is on a passive side of the transaction or an aggressive side of the transaction.

36. The method of claim 25, wherein:
the electronic trading system maintains one timer per instrument traded.

37. The method of claim 25, wherein:
the electronic trading system is programmed to cancel the automatic execution if either crossed market maker order is cancelled or if the price is changed.

38. The method of claim 25, wherein:
the electronic trading system is programmed to vary the period of time for the timer based at least in part on market volatility.

39. The method of claim 25, wherein:
the electronic trading system is programmed to trade multiple instruments, and is programmed to vary the period of time for the timer based on the instrument.

40. The method of claim 25, wherein:
the electronic trading system is programmed to vary the period of time for the timer based at least in part on one or more of current price and average trading volume.

41. A method, comprising the steps of:
by at least one computer of an electronic trading system, determining whether received orders to trade an instrument are placed via graphical user interfaces of computer terminals of market-makers, the received orders comprising a bid order for the instrument and an offer order for the instrument;
by the at least one computer of the electronic trading system, determining whether the bid order for the instrument crosses price with the offer order for the instrument;
by the at least one computer of the electronic trading system, enabling an auto-execute mode to automatically execute trades in crossed markets except crossed markets between market makers;
automatically preventing execution of crossed market maker orders against each other, creating a locked market for the crossed market maker orders, disabling display at interfaces of terminals of customers of data representing crossed market maker orders;
based at least in part on a determination by the at least one computer of the electronic trading system that a price of a bid order crosses the price of an offer order, perform one of the following:

(a) responsive to determining that both crossed orders are from market makers or if both crossed orders are from non-market makers, in which one of the second bid and second offer comprises a later order that was received later than the other of the second bid and second offer, executing a trade between the crossed orders at the price of the later order;
(b) responsive to determining that the later crossed order is from a market maker and the earlier crossed order is from a non-market-maker, executing a trade between the crossed orders at the price of the earlier non-market-maker order; and
enabling display, at interfaces of terminals of the customers, data representing the crossed market maker orders upon execution of the crossed market makers orders.

42. The method of claim 41, further comprising the step of:
based at least in part on a determination by the at least one computer of the electronic trading system that a price of a bid order crosses the price of an offer order, and that the crossed orders are each from market makers, automatically taking at least one of the following actions:
(a) adjusting a price of at least one of the crossed market maker orders to match the price of the other crossed market maker order, and publishing the adjusted price order to the market for execution by non-market makers while not executing the market makers' orders against each other;
(b) adjusting the price of at least one of the crossed market maker orders to match the price of the other crossed market maker order, and executing the adjusted price order against any matching orders from non-market maker traders, while not executing the market makers' orders against each other; and
(c) starting a timer delaying execution of the crossed market maker orders against each other for a period of time, and if the crossed market maker orders remain matching or crossed at expiry of the timer, automatically executing the two market maker orders against each other.

43. The method of claim 41, further comprising the step of:
adjusting a price of at least one of the crossed market maker orders to match the price of the other crossed market maker order, and publishing the adjusted price order to the market for execution by non-market makers while not executing the market makers' orders against each other.

44. The method of claim 41, further comprising the step of: adjusting the price of at least one of the crossed market maker orders to match the price of the other crossed market maker order, and executing the adjusted price order against any matching orders from non-market maker traders, while not executing the market makers' orders against each other.

45. The method of claim 41, further comprising the step of:
based at least in part on a determination by the at least one computer of the electronic trading system that a price of a bid crosses the price of an offer, and that the crossed bid and offer orders are each from market makers, automatically starting a timer delaying execution of the crossed market maker orders against each other for a period of time, and if the crossed market maker orders remain matching or crossed at expiry of the timer, automatically executing the two market maker orders against each other.

46. The method of claim 41, further comprising the step of:

based at least in part on a determination by the at least one computer of the electronic trading system that a price of a bid order locks or crosses the price of an offer order, and that the locked or crossed orders are each from market makers, starting a timer delaying execution of the locked or crossed market maker orders against each other for a period of time; and if the crossed market maker orders remain matching at expiry of the timer, automatically executing the two market maker orders against each other.

47. A method, comprising the steps of:

receiving a first order via a graphical user interface of a computer terminals of a first market maker on a passive side;

by the at least one computer of the electronic trading system, enabling an auto-execute mode to automatically execute trades in crossed markets except crossed markets between market makers;

after receiving the first order, receiving a second order via a graphical user interface of a computer terminals of a second market maker on an aggressive side;

automatically preventing execution of the crossed market maker orders against each other, creating a locked market for the crossed market maker orders, disabling display at interfaces of terminals of customers of data representing the crossed market maker orders;

executing a first transaction in an electronic trading system that crosses at least a portion of the first order with at least a portion of the second order, wherein the electronic trading system is configured such that brokerage fees for market makers are the same whether the market maker is on a passive side or aggressive side of a transaction, and wherein brokerage fees for the first transaction for the first market maker on the passive side are the same as brokerage fees for the first transaction for the second market maker on the aggressive side; and enabling display, at interfaces of terminals of the customers, data representing the crossed market maker orders upon execution of the crossed market makers orders.

48. The method of claim 47, further comprising the step of:

by the at least one computer of the electronic trading system, determining whether the orders are placed by market-makers, the received orders comprising a bid order for the instrument and an offer order for the instrument;

by the at least one computer of the electronic trading system, determining whether the bid order for the instrument crosses price with the offer order for the instrument;

based at least in part on a determination by the at least one computer of the electronic trading system that a price of a bid order crosses the price of an offer order, and that the crossed orders are each from market makers, automatically taking at least one of the following actions:

(a) adjusting a price of at least one of the crossed market maker orders to match the price of the other crossed market maker order, and publishing the adjusted price order to the market for execution by non-market makers while not executing the market makers' orders against each other;

(b) adjusting the price of at least one of the crossed market maker orders to match the price of the other crossed market maker order, and executing the adjusted price order against any matching orders from non-market maker traders, while not executing the market makers' orders against each other; and (c) starting a timer delaying execution of the crossed market maker orders against each other for a period of time, and if the crossed market maker orders remain matching or crossed at expiry of the timer, automatically executing the two market maker orders against each other.

49. The method of claim 47, further comprising the step of:

adjusting a price of at least one of the crossed market maker orders to match the price of the other crossed market maker order, and publishing the adjusted price order to the market for execution by non-market makers while not executing the market makers' orders against each other.

50. The method of claim 47, further comprising the step of: adjusting the price of at least one of the crossed market maker orders to match the price of the other crossed market maker order, and executing the adjusted price order against any matching orders from non-market maker traders, while not executing the market makers' orders against each other.

51. The method of claim 47, further comprising the step of:

based at least in part on a determination by the at least one computer of the electronic trading system that a price of a bid crosses the price of an offer, and that the crossed bid and offer orders are each from market makers, automatically starting a timer delaying execution of the crossed market maker orders against each other for a period of time, and if the crossed market maker orders remain matching or crossed at expiry of the timer, automatically executing the two market maker orders against each other.

52. The method of claim 47, further comprising the step of:

based at least in part on a determination by the at least one computer of the electronic trading system that a price of a bid order locks or crosses the price of an offer order, and that the locked or crossed orders are each from market makers, starting a timer delaying execution of the locked or crossed market maker orders against each other for a period of time; and if the crossed market maker orders remain matching at expiry of the timer, automatically executing the two market maker orders against each other.

53. The method of claim 47, further comprising the step of:

based at least in part on a determination by the at least one computer of the electronic trading system that a price of a bid order crosses the price of an offer order, handling the crossed orders:

(a) on determination that both crossed orders are from market makers or that both crossed orders are from non-market makers, in which one of the second bid and second offer comprises a later order that was received later than the other of the second bid and second offer, executing a trade between the crossed orders at the price of the later order;

(b) on determination that the later crossed order is from a market maker and the earlier crossed order is from a non-market-maker, executing a trade between the crossed orders at the price of the earlier non-market-maker order.

54. A system comprising:
at least one processor of at least one computer of an electronic trading system;
at least one memory in electronic communication with the at least one processor having instructions stored thereon which, when executed by the at least one processor, direct the at least one processor to:
determine whether received orders to trade an instrument are placed via graphical user interfaces of computer terminals of market-makers, the received orders comprising a bid order for the instrument and an offer order for the instrument;
determine whether the bid order for the instrument crosses price with the offer order for the instrument;
if a price of a bid order crosses a price of an offer order such that the bid and offer are crossed orders with respect to one another, and the crossed orders are each from market makers, automatically prevent execution of the crossed market maker orders against each other, create a locked market for the crossed market maker orders, disable display at interfaces of terminals of customers of data representing the crossed market maker orders, and automatically start a timer delaying execution of the crossed market maker orders against each other for a period of time, and automatically:
(a) adjust a price of at least one of the crossed market maker orders to match the price of the other crossed market maker order, and publish the adjusted price order to the market for execution by non-market makers while not executing the market makers' orders against each other;
(b) adjust the price of at least one of the crossed market maker orders to match the price of the other crossed market maker order, and execute the adjusted price order against any matching orders from non-market maker traders, while not executing the market makers' orders against each other; and
(c) if the crossed market maker orders remain matching or crossed at expiry of the timer, execute the two market maker orders against each other at the price of the later-received one of the crossed market maker orders;
if the later crossed order is from a market maker and the earlier crossed order is from a non-market-maker, execute a trade between the crossed orders at the price of the earlier non-market-maker order; and
wherein brokerage fees for any market makers who submitted orders that were executed are configured such that the brokerage fees are the same whether the market maker is on a passive side of the transaction or an aggressive side of the transaction; and
enable display, at interfaces of terminals of the customers, data representing the crossed market maker orders upon execution of the crossed market makers orders.

55. A non-transitory computer-readable medium having instructions stored thereon that, when executed by at least one processor, are configured to perform the following actions:
determine whether received orders to trade an instrument are placed via graphical user interfaces of computer terminals of market-makers, the received orders comprising a bid order for the instrument and an offer order for the instrument;
determine whether the bid order for the instrument crosses price with the offer order for the instrument;
if a price of a bid order crosses a price of an offer order such that the bid and offer are crossed orders with respect to one another, and the crossed orders are each from market makers, automatically prevent execution of the crossed market maker orders against each other, create a locked market for the crossed market maker orders, disable display at interfaces of terminals of customers of data representing the crossed market maker orders, and automatically start a timer delaying execution of the crossed market maker orders against each other for a period of time, and automatically by the at least one computer of the electronic trading system taking at least one of the following actions (a), (b) and (c):
(a) adjust a price of at least one of the crossed market maker orders to match the price of the other crossed market maker order, and publish the adjusted price order to the market for execution by non-market makers while not executing the market makers' orders against each other;
(b) adjust the price of at least one of the crossed market maker orders to match the price of the other crossed market maker order, and execute the adjusted price order against any matching orders from non-market maker traders, while not executing the market makers' orders against each other; and
(c) if the crossed market maker orders remain matching or crossed at expiry of the timer, execute the two market maker orders against each other at the price of the later-received one of the crossed market maker orders;
if the later crossed order is from a market maker and the earlier crossed order is from a non-market-maker, execute a trade between the crossed orders at the price of the earlier non-market-maker order; and
wherein brokerage fees for any market makers who submitted orders that were executed are configured such that the brokerage fees are the same whether the market maker is on a passive side of the transaction or an aggressive side of the transaction; and
enable display, at interfaces of terminals of the customers, data representing the crossed market maker orders upon execution of the crossed market makers orders.

* * * * *